United States Patent
Lee et al.

(10) Patent No.: US 8,539,590 B2
(45) Date of Patent: Sep. 17, 2013

(54) PROTECTING ELECTRONIC DEVICES FROM EXTENDED UNAUTHORIZED USE

(75) Inventors: Michael M. Lee, San Jose, CA (US); Jay F. Hamlin, Santa Cruz, CA (US); Brian D. Lemker, San Jose, CA (US)

(73) Assignee: Apple Inc., Cupertino, CA (US)

( * ) Notice: Subject to any disclaimer, the term of this patent is extended or adjusted under 35 U.S.C. 154(b) by 1265 days.

(21) Appl. No.: 11/313,886

(22) Filed: Dec. 20, 2005

(65) Prior Publication Data

US 2007/0138999 A1 Jun. 21, 2007

(51) Int. Cl.
*G06F 7/04* (2006.01)
*G06F 17/30* (2006.01)
*G06F 15/16* (2006.01)

(52) U.S. Cl.
USPC ...... 726/26; 726/4; 726/34; 726/35; 713/193; 713/194; 320/107; 455/411; 455/572; 455/573

(58) Field of Classification Search
USPC ............. 726/26, 34, 4, 35; 713/193–194; 320/107; 455/411, 572, 573
See application file for complete search history.

(56) References Cited

U.S. PATENT DOCUMENTS

| | | | | |
|---|---|---|---|---|
| 5,258,656 A | * | 11/1993 | Pawlick | 307/141 |
| 5,412,370 A | * | 5/1995 | Berman et al. | 340/426.36 |
| 6,108,785 A | * | 8/2000 | Poisner | 726/20 |
| 6,504,480 B1 | * | 1/2003 | Magnuson et al. | 340/571 |
| 6,560,711 B1 | * | 5/2003 | Given et al. | 726/34 |
| 6,618,810 B1 | * | 9/2003 | Dirie | 726/27 |
| 7,178,167 B1 | * | 2/2007 | Katoh et al. | 726/26 |
| 7,266,849 B1 | * | 9/2007 | Gregory et al. | 726/34 |
| 7,400,878 B2 | * | 7/2008 | Hassan et al. | 455/410 |
| 7,809,353 B2 | * | 10/2010 | Brown et al. | 455/410 |
| 7,823,180 B2 | * | 10/2010 | Tanaka et al. | 725/100 |
| 7,869,789 B2 | * | 1/2011 | Hassan et al. | 455/410 |
| 2003/0034757 A1 | * | 2/2003 | Woodnorth | 320/132 |
| 2003/0097596 A1 | * | 5/2003 | Muratov et al. | 713/202 |
| 2003/0115474 A1 | * | 6/2003 | Khan et al. | 713/186 |
| 2003/0126462 A1 | * | 7/2003 | Howard et al. | 713/200 |
| 2005/0020315 A1 | * | 1/2005 | Robertson | 455/565 |
| 2005/0021468 A1 | * | 1/2005 | Stockton | 705/51 |
| 2005/0044404 A1 | * | 2/2005 | Bhansali et al. | 713/200 |
| 2005/0046580 A1 | * | 3/2005 | Miranda-Knapp et al. | 340/686.1 |
| 2005/0235169 A1 | * | 10/2005 | Lou | 713/320 |

(Continued)

FOREIGN PATENT DOCUMENTS

GB 2 389 004 A * 11/2003

OTHER PUBLICATIONS

"Headphones," Wikipedia, the free encyclopedia, http://en.wikipedia.org/wiki/Earbuds, p. 1-6.

*Primary Examiner* — Edan Orgad
*Assistant Examiner* — Kari Schmidt
(74) *Attorney, Agent, or Firm* — Womble Carlyle Sandridge & Rice LLP

(57) ABSTRACT

When unauthorized use of a device is suspected, a recharging mechanism (e.g., recharge-circuit) of the device is disabled in order to guard against extended unauthorized use of the device. The recharging mechanism normally recharges the rechargeable-power-supply that powers the device. Consequently, normal use and enjoyment of the device can be significantly reduced by disabling the rechager. Moreover, for devices that are mainly powered by a rechargeable-power-supply (e.g., music-players, phones, Personal Digital Assistants), disabling the recharger effectively renders the device inoperable when the power of the main power-supply has run out. As such, disabling the recharger should serve as a deterrent to theft.

20 Claims, 7 Drawing Sheets

(56) References Cited

U.S. PATENT DOCUMENTS

| | | | |
|---|---|---|---|
| 2005/0248543 A1* | 11/2005 | North et al. | 345/173 |
| 2006/0005230 A1* | 1/2006 | England et al. | 726/1 |
| 2006/0036781 A1* | 2/2006 | Thacker | 710/36 |
| 2006/0136746 A1* | 6/2006 | Al-Khateeb | 713/189 |
| 2006/0149966 A1* | 7/2006 | Buskey et al. | 713/168 |
| 2006/0236364 A1* | 10/2006 | Suni et al. | 726/1 |
| 2006/0288234 A1* | 12/2006 | Azar et al. | 713/186 |
| 2006/0294599 A1* | 12/2006 | Sim et al. | 726/34 |
| 2008/0005561 A1* | 1/2008 | Brown et al. | 713/164 |

\* cited by examiner

PROTECTING ELECTRONIC DEVICES FROM EXTENDED UNAUTHORIZED USE

BACKGROUND OF THE INVENTION

Most people are familiar with rechargeable-power supplies (e.g., rechargeable batteries) and use them in everyday life. More traditional devices (e.g., mechanical toys) operating with a rechargeable-power-supply (e.g., a battery) have been in use for sometime now. More recently, various types of electronic devices (e.g., digital music-players) have been introduced and have become very popular. Similar to more traditional devices, some of these electronic devices operate with a rechargeable-power-supply. One such electronic device is the Apple iPod digital music-player: (iPod). Apple iPod has become very popular and is generally known at least in the United States. Apple iPod digital music-player is powered by a rechargeable battery that can be recharged by connecting a recharge-circuit directly or indirectly to a power-supply (e.g., electric outlet found in most homes). The battery that runs the Apple iPod digital music-player can be recharged by using an adapter that effectively connects a recharge-circuit to a power-supply or indirectly via a connection (e.g., USB2) to a Personal Computer (PC).

In general, a rechargeable-power-supply that powers a device can be recharged by a recharging mechanism. Such devices (e.g., portable electronic device, mechanical toy) are typically valuable and/or may contain valuable data (e.g., music files). As such, techniques for protecting devices against unauthorized use would be useful.

SUMMARY OF THE INVENTION

Broadly speaking, the invention pertains to techniques for protecting against extended unauthorized use of device. It will be appreciated that hindering the normal use and enjoyment of devices which are in use without proper authorization (e.g., disabling the ability of such devices to be recharged) can serve as a deterrent to theft. This should also result in a significant reduction of crime against the lawful owners of such devices.

In accordance with one aspect of the invention, when unauthorized use of a device is suspected, a recharging mechanism (e.g., recharge-circuit) of the device is disabled in order to guard against extended unauthorized use of the device. The recharging mechanism normally recharges the rechargeable-power-supply that powers the device. Consequently, normal use and enjoyment of the device can be significantly reduced when the recharger is disabled. Moreover, for devices that are mainly powered by a rechargeable-power-supply (e.g., music-players, phones, Personal Digital Assistants), disabling the recharger effectively renders the device inoperable when the power of the main power-supply has run out.

In one embodiment, unauthorized use is suspected when an event, condition, or situation occurs (e.g., a timer expires, device is connected to a power-supply or another device, device is outside a determined geographical boundary). In any case, when unauthorized use is suspected, an authorization process can be initiated (e.g., an authorization-code or security-code may be requested). If the authorization process fails to authorize the user, the recharger mechanism is disabled so that it can no longer recharge the rechargeable-power-supply. The recharger may subsequently be enabled if the user can be authorized.

In accordance with another embodiment of the invention, a device can automatically detect whether it has been just connected to another component (e.g., adapter, personal computer) that has not been authorized. Hence, an authorization process may be initiated when the device is connected to an unauthorized device. However, a lawful owner of the device can configure and authorize devices that are known by a unique identifier (e.g., adapter-id, processor-id) and authorize a new device during the authorization process.

Another aspect of the invention pertains to techniques for detecting unauthorized use of devices. When a connection is made to a device, it is determined whether the device is authorized for use (e.g., has not been reported stolen, not out of a geographical boundary). Typically, devices make a connection to a service provider (e.g., server) to request services (e.g., down-load music, check account). As such, it is possible to check for unauthorized use of the devices based on various criteria. If unauthorized use of the device is suspected one or more operations can be performed to effectively hamper the normal use and enjoyment of the devices. These operations include: disabling the recharger mechanism, disabling the downloading capability, and not allowing the requested operation.

The invention can be implemented in numerous ways, including a method, an apparatus, a computer readable medium, a computing device, or a signal embodied in a carrier wave. Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
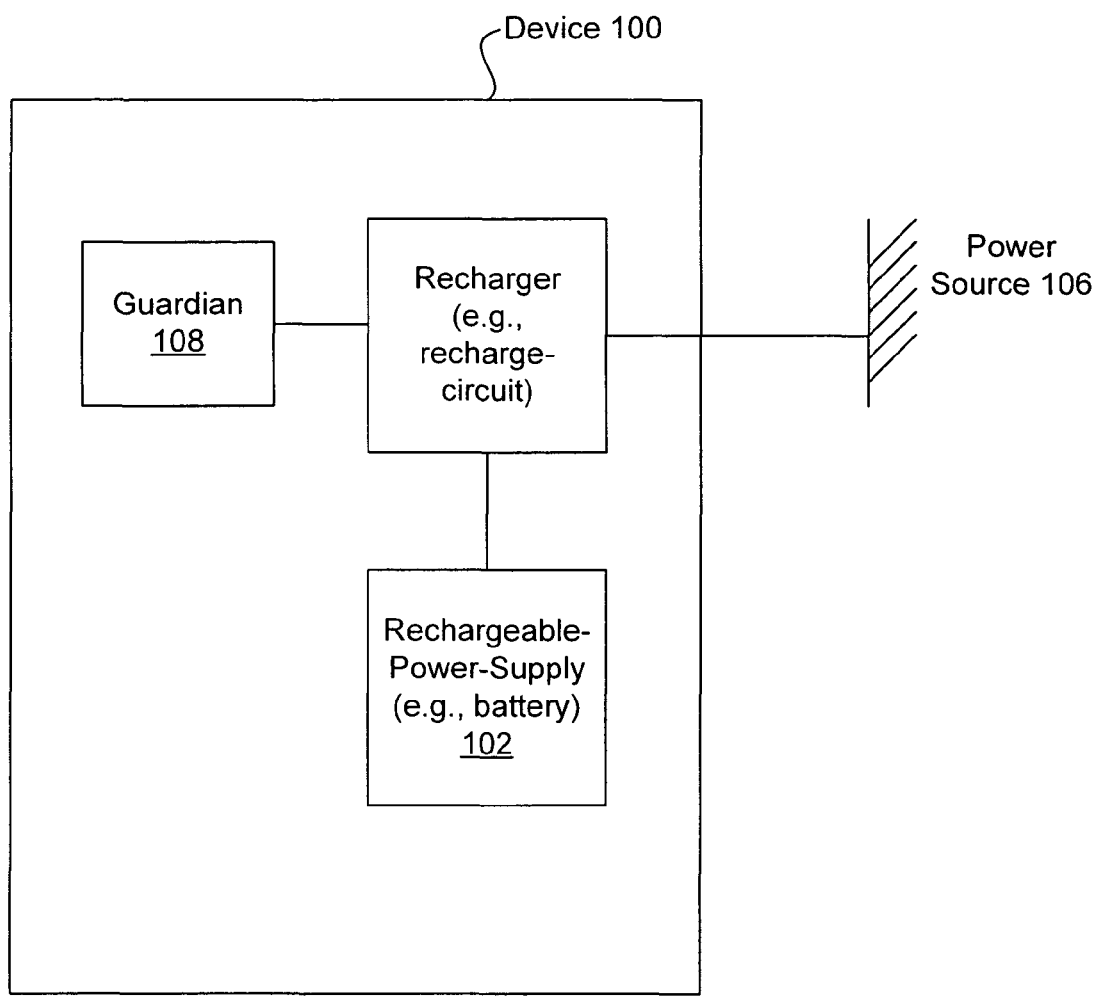
FIG. 1A depicts a device in accordance with one embodiment of the invention.

As noted in the background section, a rechargeable-power-supply (e.g., a rechargeable battery) that powers a device can be recharged by a recharging mechanism (e.g., recharge-circuit). Devices that are powered by a rechargeable-power-supply provide a mechanism for recharging the rechargeable-power-supply. These devices (e.g., portable electronic devices, mechanical toys) are generally valuable and/or may contain valuable data. Unfortunately, theft of more popular electronic devices such as the Apple iPod music-player has become a serious problem. In a few reported cases, owners of the Apple iPod themselves have been seriously injured or even murdered. Hence, techniques that can protect against unauthorized use and deter and reduce theft of such devices would be highly useful.

Accordingly, the invention pertains to techniques for protecting against extended unauthorized use of device. It will be appreciated that hindering the normal use and enjoyment of devices which are in use without proper authorization (e.g., disabling the ability of such devices to be recharged) can serve as a deterrent to theft. This should also result in a significant reduction of crime against the lawful owners of such devices.

In accordance with one aspect of the invention, when unauthorized use of a device is suspected, a recharging mechanism (e.g., recharge-circuit) of the device is disabled in order to guard against extended unauthorized use of the device. The recharging mechanism normally recharges the rechargeable-power-supply that powers the device. Consequently, normal use and enjoyment of the device can be significantly reduced when the recharger is disabled. Moreover, for devices that are mainly powered by a rechargeable-power-supply (e.g., music-players, phones, Personal Digital Assistants), disabling the recharger effectively renders the device inoperable when the power of the main power-supply has run out. Therefore, disabling the recharger should serve as a deterrent to theft.

In one embodiment, unauthorized use is suspected when an event, condition, or situation occurs (e.g., a timer expires, device is connected to a power-supply or another device, device is outside a determined geographical boundary). In any case, when unauthorized use is suspected, an authorization process can be initiated (e.g., an authorization-code or security-code may be requested). If the authorization process fails to authorize the user, the recharger mechanism is disabled so that it can no longer recharge the rechargeable-power-supply. The recharger may subsequently be enabled if the user can be authorized.

In accordance with another embodiment of the invention, a device can automatically detect whether it has been just connected to another component (e.g., adapter, personal computer) that has not been authorized. Hence, an authorization process may be initiated when the device is connected to an unauthorized device. However, a lawful owner of the device can configure and authorize devices that are known by a unique identifier (e.g., adapter-id, processor-id) and authorize a new device during the authorization process.

Another aspect of the invention pertains to techniques for detecting unauthorized use of devices. When a connection is made to a device, it is determined whether the device is authorized for use (e.g., has not been reported stolen, not out of a geographical boundary). Typically, devices make a connection to a service provider (e.g., server) to request services (e.g., down-load music, check account). As such, it is possible to check for unauthorized use of the devices based on various criteria. If unauthorized use of the device is suspected one or more operations can be performed to effectively hamper the normal use and enjoyment of the devices. These operations include: disabling the recharger mechanism, disabling the Embodiments of these aspects of the invention are discussed below with reference to FIGS. 1A-5. However, those skilled in the art will readily appreciate that the detailed description given herein with respect to these figures is for explanatory purposes as the invention extends beyond these limited embodiments.

FIG. 1A depicts a device 100 in accordance with one embodiment of the invention. The device 100 can, for example, be a personal computer, a portable device (e.g., personal computer, cell phone, Global Positioning System (GPS), media-player, wireless phone, personal digital assistant). As shown in FIG. 1A, a rechargeable-power-supply 102 (e.g., a battery) and a recharger (e.g., a recharge-circuit) 104 are provided for the device 100. Normally, the recharger 104 can be connected to a power source 106 in order to charge the rechargeable-power-supply 102. In other words, the recharger 104 can charge the rechargeable-power-supply 102 when connected to the power source 106.

It will be appreciated that a guardian 108 can disable the recharger 104 in order to effectively prevent the recharger 104 to charge the rechargeable-power-supply 102 even when the recharger 104 is connected to the power source 106. Moreover, the guardian 108 can disable the recharger 104 when unauthorized use of the device is suspected. Unauthorized use can be suspected when, for example, an event, condition, or situation indicates that the device may be used without authorization. As will be described in more detail below, such an event, condition, or situation can, for example, be the expiration of a timer, connection of the device 100 to another object (e.g., another device, adaptor), or removal of the device from a geographical boundary. When such event, condition, or situation occurs, the guardian 108 may disable the recharger 104 so that the recharger 104 cannot charge the rechargeable-power-supply 102. This significantly hampers the normal use and enjoyment of device 100. If the rechargeable-power-supply 102 is the main source of power, disabling the recharger 104 would render the device effectively useless as it cannot be operated without power supply. It will be appreciated that among other things, this would serve as a theft deterrent.

It should be noted that if the guardian 108 determines that the use of the device 100 is authorized, it does not disable the recharger 104. By way of example, when a timer has expired, the guardian 108 can prompt for a security-code (e.g., password) which if entered correctly, would result in setting the timer again (e.g., for 30 days) without disabling the recharger 104. Alternatively, the guardian 108 can, for example, be configured to automatically disable the recharger 104 when an event, condition, or situation occurs (e.g., a timer expires). In such cases, the guardian 108 would enable the recharger 104 when authorized use has been established (e.g., the correct security-code is entered). Actually, It will be apparent to those skilled in the art that the guardian 108 can be configured based on one or more criteria (e.g., numerous events, conditions, or situations) that indicate potential unauthorized use of the device 100. Furthermore, various criteria can be combined with numerous actions (e.g., disable first if taken out of a geographical boundary, ask for authorization first if the timer expires, disable first if connected to an unknown device).

Figure 1B:
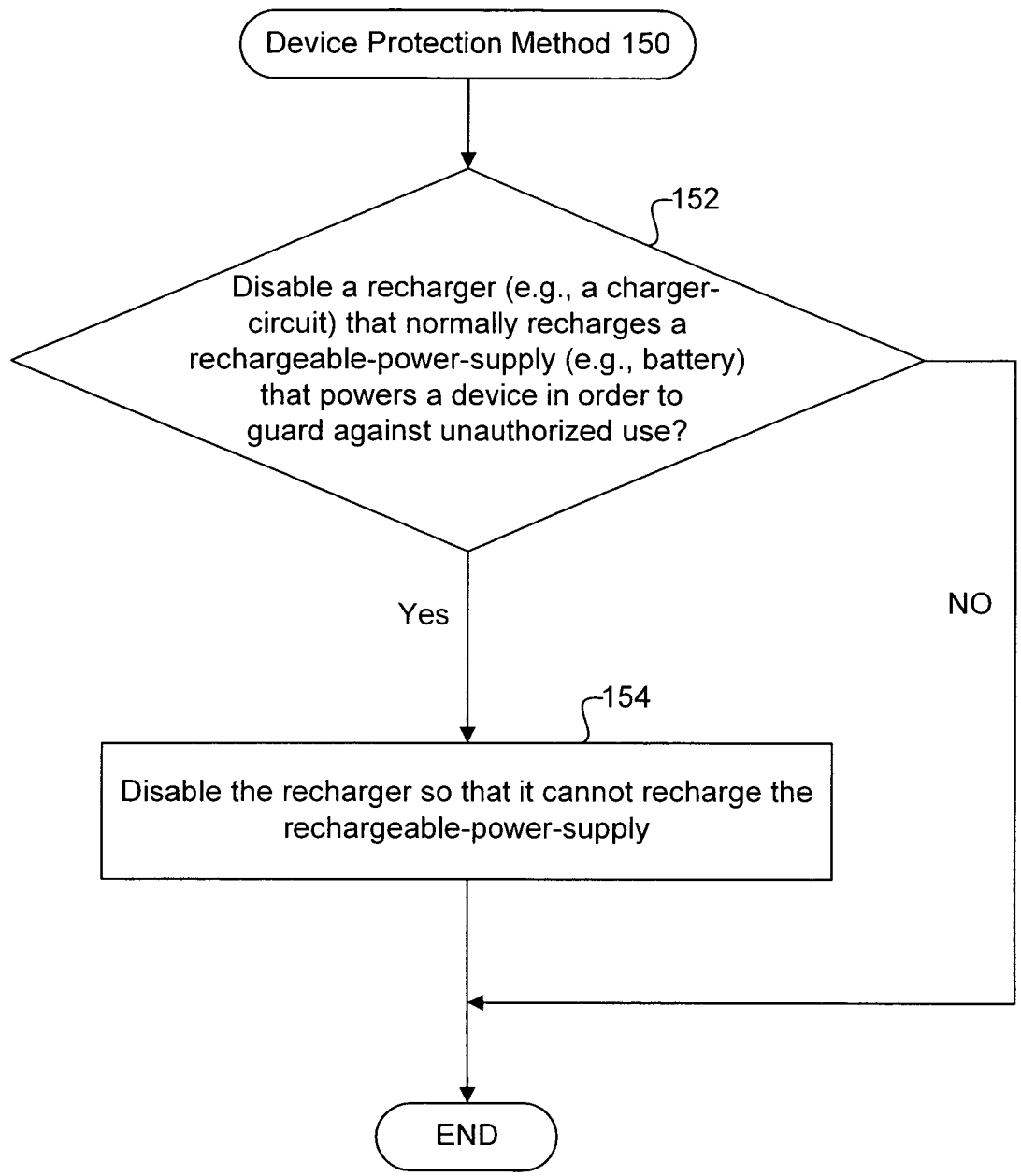
FIG. 1B depicts a device-protection method for protecting device against unauthorized use in accordance with one embodiment of the invention.

FIG. 1B depicts a device-protection method 150 for protecting a device against unauthorized use in accordance with one embodiment of the invention. In order to protect the device against unauthorized use, it is determined (152) whether to disable a recharger (e.g., a recharge-circuit) that normally charges a rechargeable-power-supply (e.g., battery) when connected to a power source (outlet). The device is powered by the rechargeable-power-supply. Accordingly, if it is determined (152) not to disable the recharger, the device-protection method 150 ends. However, if it is determined (152) to disable the recharger, the recharger is disabled (154). Disabling the recharger would significantly hinder normal use and enjoyment of the device, if the rechargeable-power-supply is the main source of power.

Figure 2:
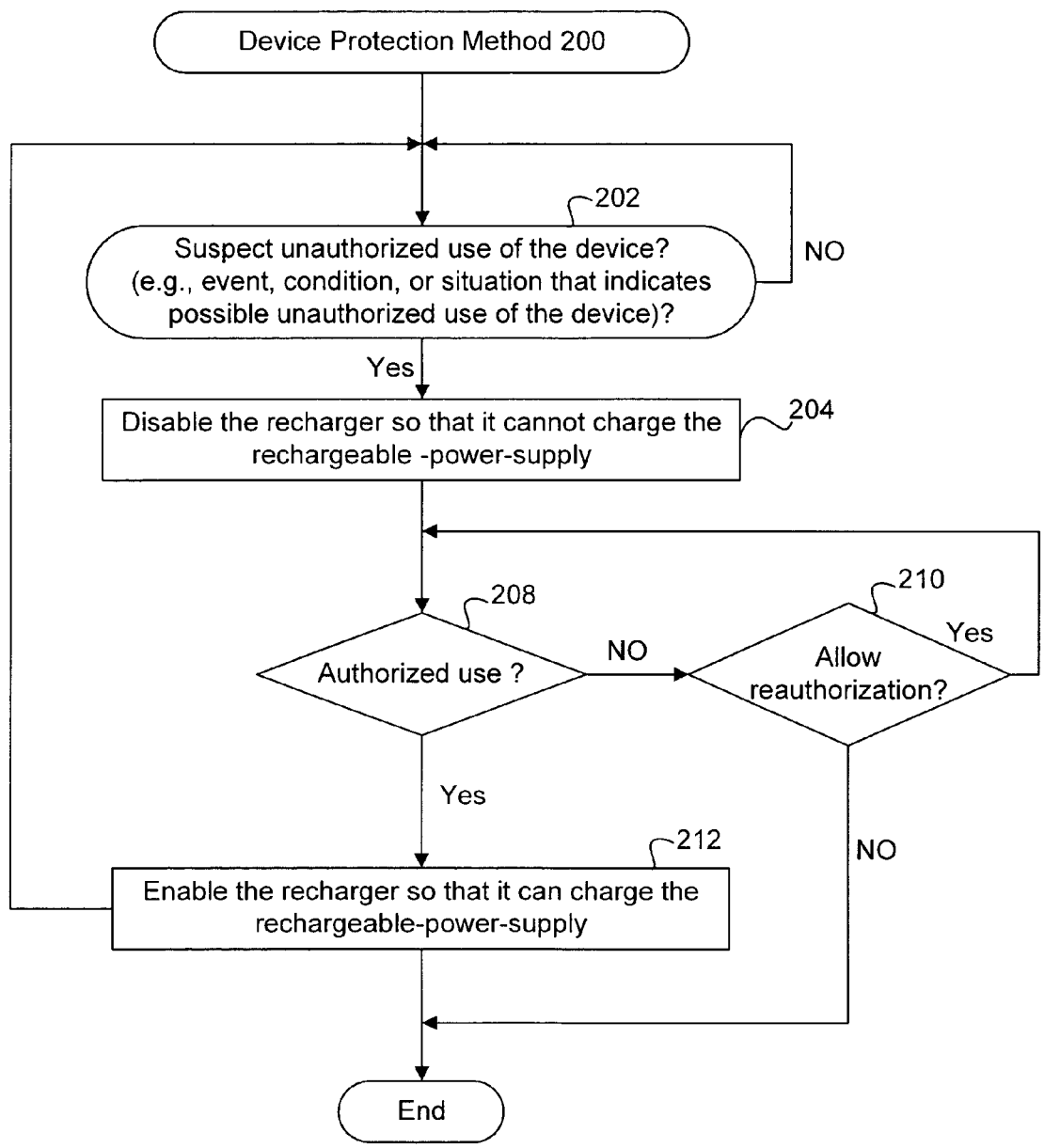
FIG. 2 depicts a device protection method for protecting a device in accordance with one embodiment of the invention.

FIG. 2 depicts a device protection method 200 for protecting a device in accordance with one embodiment of the invention. The device protection method 200 can, for example, be used by the guardian 108 shown in FIG. 1A. Initially, it is determined (202) whether potential unauthorized use of the device can be suspected based on one or more criteria (e.g., an event, condition, or situation) that indicate potential unauthorized use of the device. As noted above, an event, condition, or situation can, for example, be the expiration of a timer, connection or communication with another object (e.g., another device, adaptor, server), or locating the device outside of defined geographical region. Accordingly, if unauthorized use is suspected (202), the recharger is disabled (204) so that the recharger cannot charge the rechargeable-power-supply. Subsequently, it is determined (208) whether use of the device can be authorized. The use of device can, for example, be authorized by requiring a security-code to be entered, requiring that the device be connected to a known device, or moving the device back to a geographical boundary. If it is determined (210) that the use of the device is authorized, the recharger is enabled (212) so that it can recharge the rechargeable-power-supply. Thereafter, the device-protection method 200 proceeds to determine (202) whether unauthorized use of the device is suspected and proceeds in a similar manner as discussed above. However, if it is determined (208) that the use of the device cannot be authorized, it is determined (210) whether to allow reauthorization (e.g., allow reentering of a security-code). If it is determined (210) to allow reauthorization, the authorized use of the device is determined (208). As a result of the reauthorization, the recharger may be enabled (212). However, if no reauthorization is allowed (210), the device-protection method 200 ends and the recharger is left disabled rendering the device inoperable when the recharger that powers the device eventually runs out.

Figure 3A:
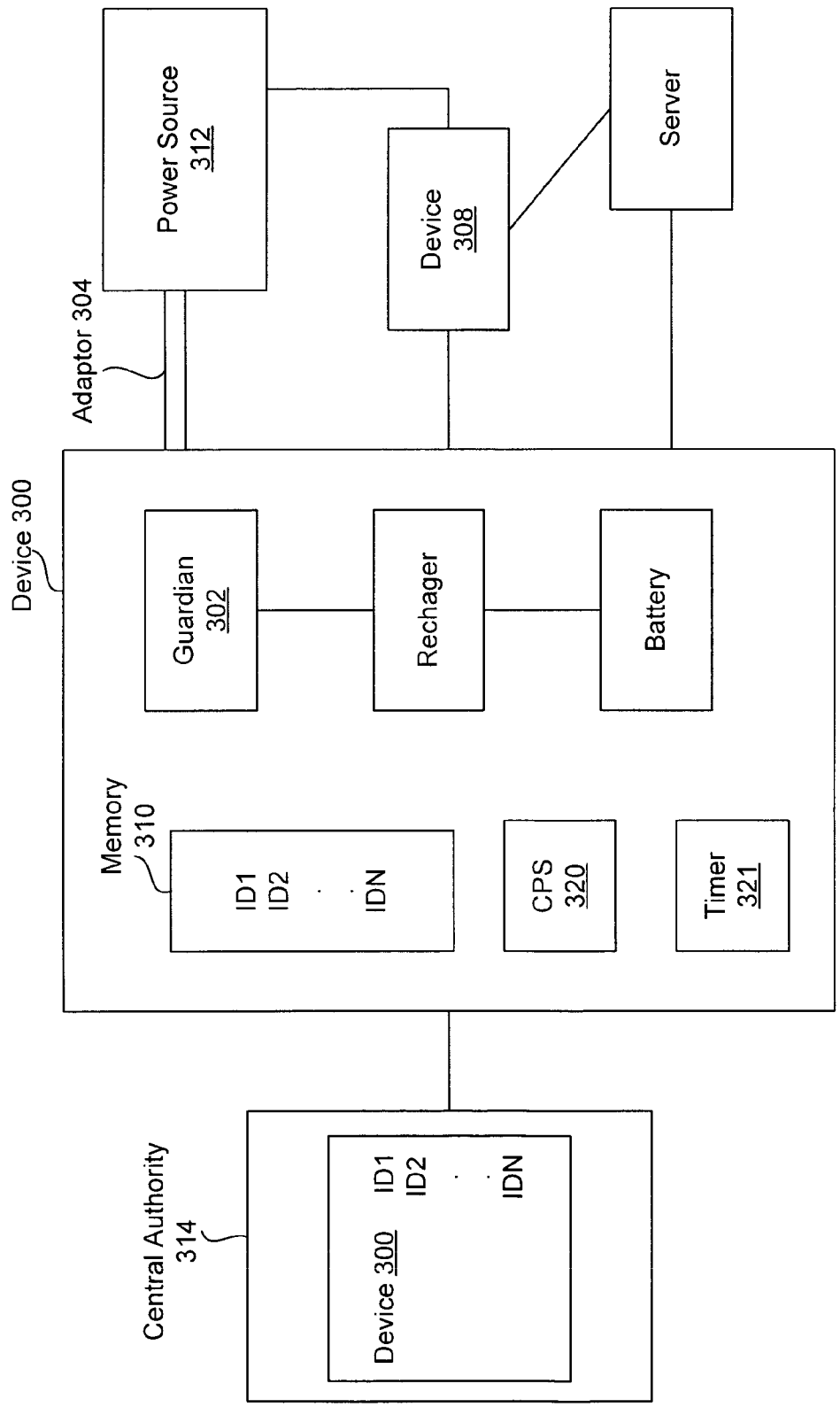
FIG. 3A depicts a device which is protected by a guardian from unauthorized use in accordance with another embodiment of the invention.

FIG. 3A depicts a device 300 which is protected by a guardian 302 from unauthorized use in accordance with another embodiment of the invention. The guardian 302 detects connection to an unauthorized object (e.g., adaptor, PC, server). More particularly, if the device 300 is directly or indirectly connected to a power source 312 and/or connects or communicates with another device, the guardian 302 effectively determines whether such activity is unauthorized. In other words, guardian 302 determines whether the adaptor 304 and/or device 308 are authorized for use with the device 300. Those skilled in the art will appreciate that this determination can, for example, be made based on a unique identification (ID) assigned to an adaptor, computer, or other components. Typically, various components used in computing systems have a unique assigned ID (e.g., processor ID, Adaptor ID). Hence, the guardian 302 can, for example, determine the ID for the adaptor and/or other device 308 as soon as connection is made to the device 300. Subsequently, the guardian 302 can determine whether the ID has been authorized by determining whether the ID is among a number of IDs that have been authorized for the device 300. As shown in FIG. 3A, a number of IDs that have been authorized for the device can, for example, be stored in memory 310 on the device and/or stored in a central authorization location 314 and provided to the device upon request. If an ID is not authorized, the guardian 302 can initiate an authorization process. The authorization process can, for example, request a security-code to be entered by the user. In one embodiment, the security-code can be defined by the user of a media-player as an item associated with the media-player (e.g., a song, a movie, a folder). It should be noted that the device 300 can also include a Global Positioning System (GPS) 320 and a timer 321.

Figure 3B:
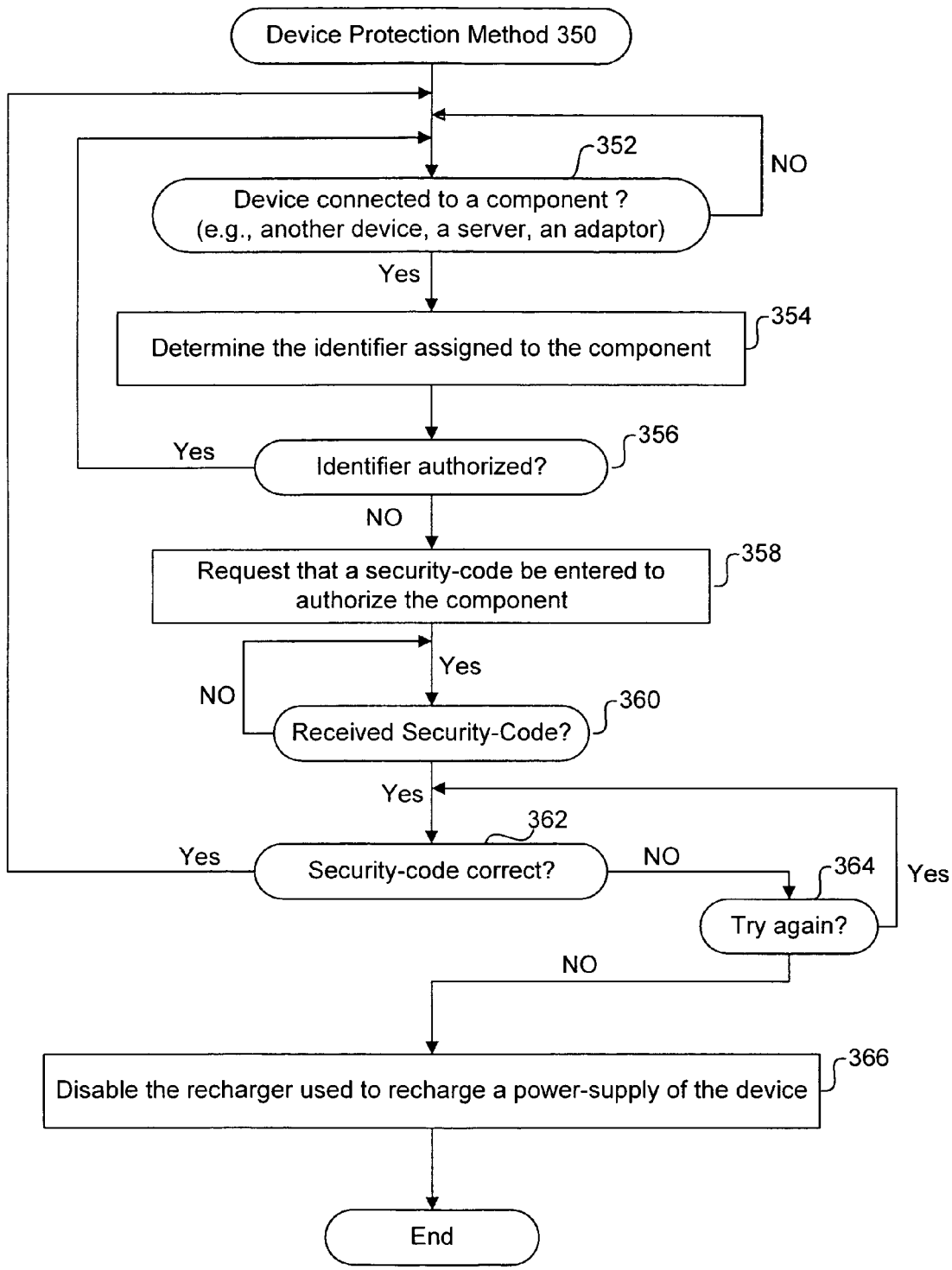
FIG. 3B depicts a device protection method for protecting a device in accordance with one embodiment of the invention.
Figure 4:
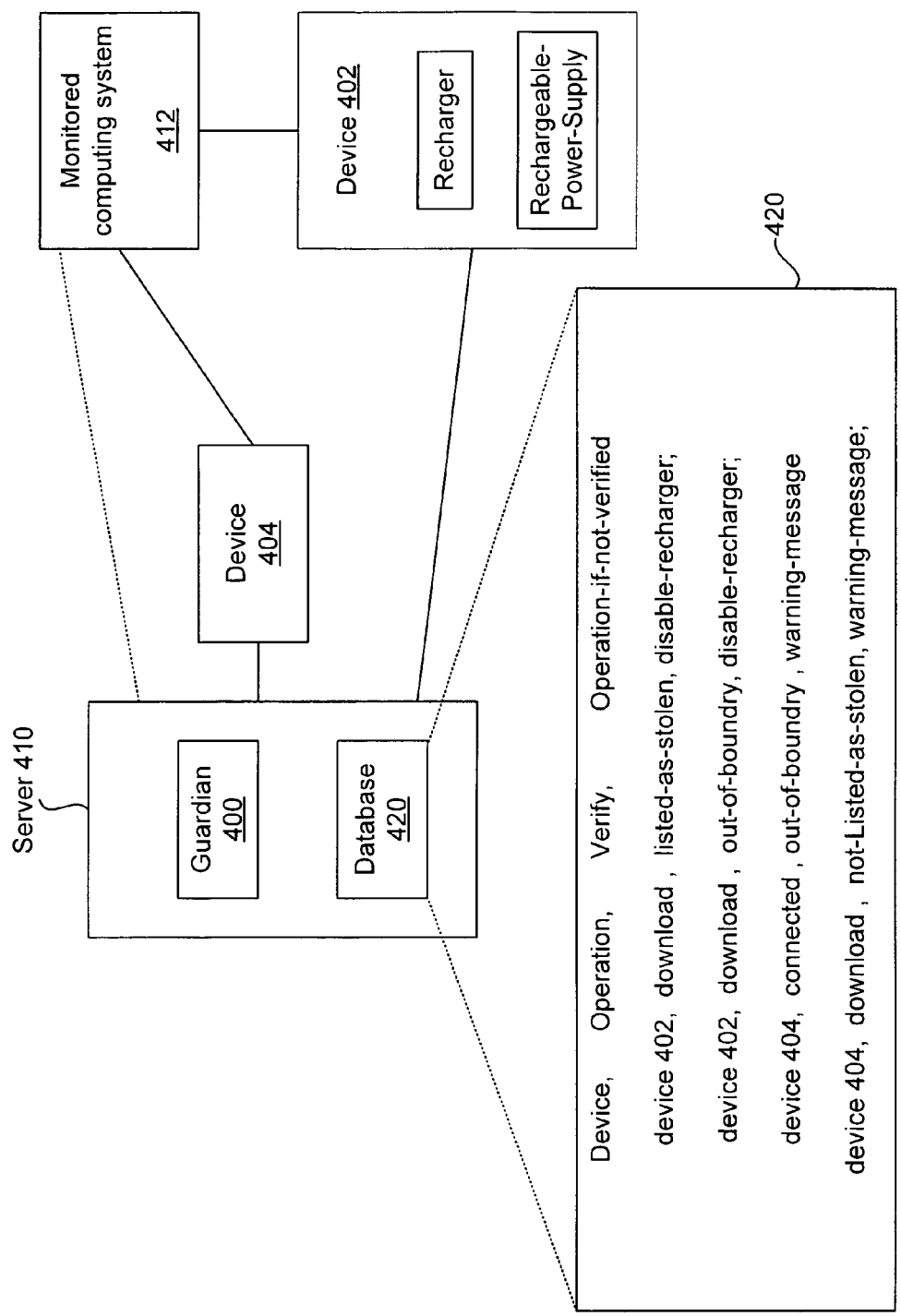
FIG. 4 depicts a guardian provided in a computing system for protection of one or more devices in accordance with one embodiment of the invention.

FIG. 3B depicts a device protection method 350 for protecting a device in accordance with one embodiment of the invention. Initially, it is determined (352) whether the device has been connected to a component (e.g., another device, a server, an adaptor). If it is determined (352) that the device has been connected to a component, an identifier (e.g., device ID, adaptor ID, processor ID) for the device is determined (354). Typically, this identifier is a unique identifier that has been assigned to the device. Accordingly, it is determined (356) whether the identifier is authorized. If it is determined (356) that the identifier is authorized, it is determined (352) whether the device has been connected to a component. In other words, the connection to a first component is effectively ignored when the connection is determined to be authorized, and it is determined whether another component has been connected to the device.

However, if it is determined (356) that the identifier is not authorized, it is requested (358) that a security-code be entered to authorize the component. Next, it is determined (360) whether the security-code is received. If it is determined (360) that the security-code has been received, it is determined (362) whether the security code is correct. If it is determined (362) that the security-code is correct, it is determined whether the device is connected to a component (i.e., another component). In other words, the connection of the device to the first component is effectively ignored if it is determined (362) that the correct security-code has been received. On the other hand, if it is determined (362) that the security-code is not correct, one or more opportunities may be given (364) to enter the correct security-code. However, if the correct security-code is not received, for example, after a determined number of tries or passage of a predetermined amount of time, the recharger that is used to recharge a power-supply of the device is disabled. The device protection method 350 ends following the disabling (366) of the recharger.

FIG. 4A depicts a guardian 400 provided for protection of one or more devices 402 and 404 in accordance with one embodiment of the invention. Guardian 400 can, for example, be provided in computing system (e.g., a server) 410 that provides one or more services accessible via devices 402 and 404. In general, devices 402 and 404 can communicate with the computing system 410. Typically, the connection is initiated by the device 402 or 404 in order to receive a service (e.g., download music, play movies, access accounts).

When a connection is established between a device 402 (or device 404) and the computing system 410 and/or another computing system 412 that is monitored by the computing system 410, the guardian 400 may be activated. When activated, the guardian 400 determines whether there is potential unauthorized use of the device 402 (or device 404). More particularly, the guardian 400 can access a database 420 to determine what to check and what action to take for a particular device. By way of example, when device 402 makes a connection to the computing system 410 in order to access a service (e.g., download music), the guardian 400 can determine the identifier assigned to the device 402 and look it up in the database 420. The information stored in the database 420 for the specific device 402 (or device category of devices) can, for example, indicate that if a download is requested, verify that the device has not been reported stolen, an/or verify that device 402 is within a geographical location, and so on. Depending on the result of the verification process, one or more actions may be taken. By way of example, the recharger of device 402 may be disabled and/or the requested operation may be denied.

Figure 5:
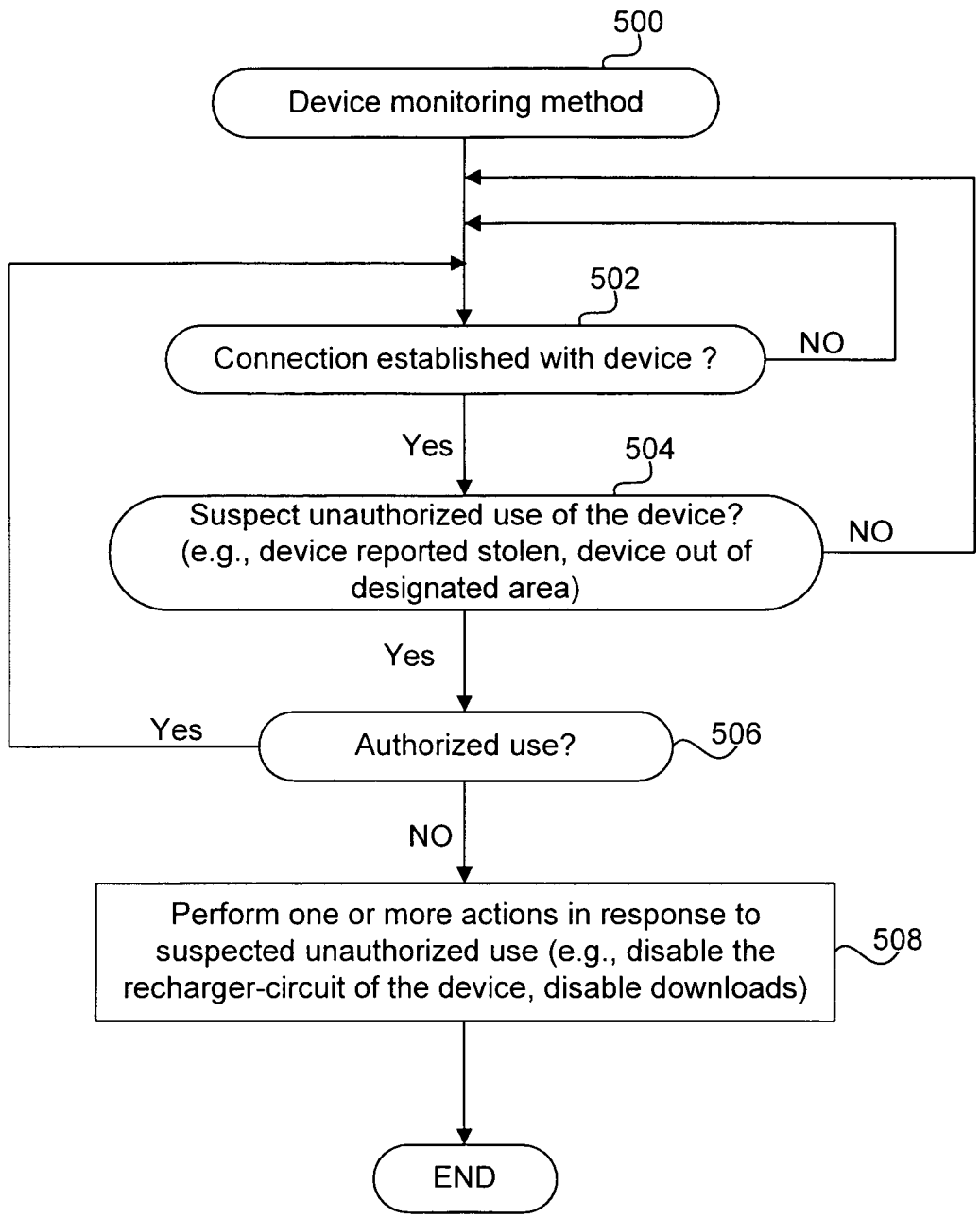
FIG. 5 depicts a monitoring method for monitoring activities of devices in accordance with one embodiment of the invention.

FIG. 5 depicts a monitoring method 500 for monitoring activities of devices in accordance with one embodiment of the invention. Initially, it is determined (502) whether a connection is established with a device. A connection can, for example, be initiated by the device to an entity (e.g., server) designated to monitor devices. In any case, if it is determined (502) that a connection is established with the device, it is determined (504) whether unauthorized use of the device is suspected (e.g., the device is reported as stolen, device is out of the designated area). If it is determined (504) that unauthorized use is not suspected, it is determined (502) whether a connection is established with the device. In other words, a first connection established with the device is effectively ignored when it is determined (504) that unauthorized use of the device is not suspected. However, if it is determined (504) that unauthorized use of the device is suspected, it is determined (506) whether the use is authorized. By way of example, a security-code can be requested, entered, and compared with the one which is assigned to that particular device. If it is determined (506) that the use of device is authorized, the connection is effectively ignored and/or the device is allowed to receive services (e.g., download music) or perform operations. On the other hand, if it is determined (506) that the device has not been authorized, one or more actions can be performed (508) in response to the suspected unauthorized use (e.g., the recharge-circuit for the device may be disabled by sending a disable command and/or installing firmware, downloading capabilities of the device can be disabled by installing firmware or software on the device). The device monitoring method 500 ends after one or more operations are performed (508) in response to suspicion of unauthorized use of the device.

What is claimed is:

1. A method for guarding against unauthorized use of a device, the method comprising:
powering up the device, wherein the device is a cell phone;
establishing, by the device, a wireless connection between the device and a remote server;
transmitting a request to download one or more media files to the remote server, wherein the request includes an identifier assigned to the device,
wherein the remote server, in response to the request, looks up the device identifier in a database accessible by the remote server, and the remote server determines from the database that the device has been reported stolen; and
disabling, by the device in response to a reply from the remote server, a recharging circuit so that the recharging circuit cannot recharge the device.

2. The method of claim 1, wherein the database includes information that indicates a condition to check and an action to take for the device identified by the device identifier.

3. The method of claim 2, wherein the information indicates that if a download is requested, the condition to check includes a verification that the device has not been reported stolen.

4. The method of claim 2, wherein the information indicates that if a download is requested, the condition to check includes a verification that the device is within a geographical location.

5. The method of claim 2, wherein the action includes the disabling the recharging circuit.

6. The method of claim 2, wherein the action includes denying the request.

7. The method of claim 1, wherein the remote server determines, in response to the request, whether the device is authorized for use.

8. The method of claim 7, further comprising enabling the recharging circuit in response to a reply from the remote server indicating that the device is authorized for use.

9. The method of claim 7, wherein the remote server determines whether the device is authorized based on a security code assigned to an authorized user of the device.

10. The method of claim 9, wherein the security code is based on one or more of the following:
a name of a song, artist, or a folder, and
digital content associated with a song, artist, or a folder.

11. A system comprising:
a processor:
a memory storing computer executable instructions that when executed by the processor cause the processor to:
power up the device, wherein the device is a cell phone;
establish, by the device, a wireless connection between the device and a remote server;
transmit a request to download one or more media files to the remote server, wherein the request includes an identifier assigned to the device,
wherein the remote server is configured to, in response to the request, look up the device identifier in a database accessible by the remote server, and the remote server is further configured to determine from the database that the device has been reported stolen; and
disable, by the device in response to a reply from the remote server, a recharging circuit so that the recharging circuit cannot recharge the device.

12. The system of claim 11, wherein the remote server is further configured to determine, in response to the request, whether the device is authorized for use.

13. The system of claim 12, wherein the instructions when executed by the processor further cause the processor to enable the recharging circuit in response to a reply from the remote server indicating that the device is authorized for use.

14. The system of claim 12, wherein the remote server is further configured to determine whether the device is authorized based on a security code assigned to an authorized user of the device.

15. The system of claim 14, wherein the security code is based on one or more of the following:
a name of a song, artist, or a folder, and
digital content associated with a song, artist, or a folder.

16. A non-transitory machine-readable medium for a computer system, the non-transitory machine-readable medium having stored thereon a series of instructions executable by a processor, the series of instructions comprising:
instructions that cause the processor to power up the device, wherein the device is a cell phone;
instructions that cause the processor to establish, by the device, a wireless connection between the device and a remote server;
instructions that cause the processor to transmit a request to download one or more media files to the remote server, wherein the request includes an identifier assigned to the device,
wherein the remote server is configured to, in response to the request, look up the device identifier in a database accessible by the remote server, and the remote server is further configured to determine from the database that the device has been reported stolen; and
instructions that cause the processor to disable, by the device in response to a reply from the remote server, a recharging circuit so that the recharging circuit cannot recharge the device.

17. The non-transitory machine-readable medium of claim 16, wherein the remote server is further configured to determine, in response to the request, whether the device is authorized for use.

18. The non-transitory machine-readable medium of claim 17, the series of instructions further comprising instructions that cause the processor to enable the recharging circuit in response to a reply from the remote server indicating that the device is authorized for use.

19. The non-transitory machine-readable medium of claim 17, wherein the remote server is further configured to determine whether the device is authorized based on a security code assigned to an authorized user of the device.

20. The non-transitory machine-readable medium of claim 19, wherein the security code is based on one or more of the following:
   a name of a song, artist, or a folder, and
   digital content associated with a song, artist, or a folder.

* * * * *